(12) United States Patent
Nyu

(10) Patent No.: US 6,324,611 B1
(45) Date of Patent: Nov. 27, 2001

(54) PHYSICAL LAYER INTERFACE AND METHOD FOR ARBITRATION OVER SERIAL BUS USING DIGITAL LINE STATE SIGNALS

(75) Inventor: Takayuki Nyu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/154,980

(22) Filed: Sep. 17, 1998

(30) Foreign Application Priority Data

Sep. 17, 1997 (JP) ................................. 9-269199

(51) Int. Cl.[7] ............... G06F 13/00; G06F 13/38
(52) U.S. Cl. .................. 710/129; 710/68; 710/70; 710/71; 709/236; 709/250; 712/1; 712/6; 712/301
(58) Field of Search ............... 710/129, 71, 70; 375/347; 709/250, 236, 213; 712/1, 6, 36, 301; 370/463

(56) References Cited

U.S. PATENT DOCUMENTS

| | | | |
|---|---|---|---|
| 4,651,316 | * 3/1987 | Kocan et al. | 370/462 |
| 4,825,402 | * 4/1989 | Jalali | 710/72 |
| 5,587,709 | * 12/1996 | Jeong | 341/100 |
| 5,684,832 | * 11/1997 | Adachi et al. | 375/262 |
| 5,717,725 | * 2/1998 | Campana, Jr. | 375/347 |
| 5,742,644 | * 4/1998 | Campana, Jr. | 375/316 |

OTHER PUBLICATIONS

M. Teener, "A Bus On A Diet—The Serial Bus Alternative, An Introduction to the P1394 High Performance Serial Bus," 1992 IEEE, Feb. 24, 1992, pp. 316–321.

* cited by examiner

*Primary Examiner*—Ayaz R. Sheikh
*Assistant Examiner*—Frantz B. Jean
(74) *Attorney, Agent, or Firm*—Sughrue, Mion, Zinn, Macpeak & Seas, PLLC

(57) ABSTRACT

A physical layer interface for a serial bus includes a controller for producing parallel data representing a near-end line state of the serial bus. A line transmitter is connected to the controller for converting the parallel data therefrom into serial data and transmitting the serial data to the serial bus. A line receiver is connected to the serial bus for receiving therefrom serial dtaa and converting the received serial data into parallel data representing a far-end line state of the serial bus. A differential line state of the serial bus is detected from the parallel data of the controller and the parallel data of the line receiver. The detected differential line state is the input to the controller. In a modified embodiment, a far-end line state of the serial bus is detected from the near-end line state of the serial bus and a far-end differential signal received by the line receiver and directly supplied to the controller. A differential line state of the serial bus is then detected using the near-end line state and the detected far-end line state and serial data representing the detected diffrential line state is sent through the line transmitter.

25 Claims, 4 Drawing Sheets

FIG. 2

| VOLTAGE | Tx-Arb[1:0]=TPA | Rx-Arb[3:2]=TPB |
|---|---|---|
| | Tx-Arb[3:2]=TPB | Rx-Arb[1:0]=TPA |
| Z | 01 | 01 |
| 0 | 00 | 00 |
| 1 | 11 | 11 |

FIG. 3

| LINE STATE TRANSMITTED | | LINE STATE RECEIVED | | DIFFERENTIAL LINE STATE DETECTED | |
|---|---|---|---|---|---|
| VOL. | Tx-Arb[1:0] | VOL. | Rx-Arb[3:2] | VOL. | Tx-Dif[1:0] |
| | Tx-Arb[3:2] | | Rx-Arb[1:0] | | Tx-Dif[3:2] |
| Z | 01 | Z | 01 | Z | 00 |
| Z | 01 | 0 | 00 | 0 | 01 |
| Z | 01 | 1 | 11 | 1 | 10 |
| 0 | 00 | Z | 01 | 0 | 01 |
| 0 | 00 | 0 | 00 | 0 | 01 |
| 1 | 11 | Z | 01 | 1 | 10 |
| 1 | 11 | 1 | 11 | 1 | 10 |

FIG. 5

| NEAR-END LINE STATE | | RECEIVED FAR-END DIFFERENTIAL STATE | | DETECTED FAR-END LINE STATE | |
|---|---|---|---|---|---|
| VOL. | Tx-Arb[1:0] / Tx-Arb[3:2] | VOL. | Rx_Dif[3:2] / Rx-Dif[1:0] | VOL. | Rx-Arb[3:2] / Rx_Arb[1:0] |
| Z | 01 | Z | 01 | Z | 00 |
| Z | 01 | 0 | 00 | 0 | 01 |
| Z | 01 | 1 | 11 | 1 | 10 |
| 0 | 00 | Z | 01 | 1 | 10 |
| 0 | 00 | 0 | 00 | 0 | 01 |
| 1 | 11 | Z | 01 | 0 | 01 |
| 1 | 11 | 1 | 11 | 1 | 10 |

| NEAR-END LINE STATE | | DETECTED FAR-END LINE STATE | | NEAR-END DIFFERENTIAL LINE STATE | |
|---|---|---|---|---|---|
| VOL. | Tx-Arb[1:0] / Tx-Arb[3:2] | VOL. | Rx-Arb[3:2] / Rx-Arb[1:0] | VOL. | Tx-Dif[3:2] / Tx-Dif[1:0] |
| Z | 01 | Z | 01 | Z | 00 |
| Z | 01 | 0 | 00 | 0 | 01 |
| Z | 01 | 1 | 11 | 1 | 10 |
| 0 | 00 | Z | 01 | 0 | 01 |
| 0 | 00 | 0 | 00 | 0 | 01 |
| 1 | 11 | Z | 01 | 1 | 10 |
| 1 | 11 | 1 | 11 | 1 | 10 |

(53, 52)

PHYSICAL LAYER INTERFACE AND METHOD FOR ARBITRATION OVER SERIAL BUS USING DIGITAL LINE STATE SIGNALS

BACKGROUND OF THE INVENTION

1. Field of the Invention

The present invention relates to generally to high speed data transmission on serial buses, and more specifically to a physical layer interface than can extend the maximum length of IEEE 1394 serial bus between adjacent nodes.

2. Description of the Related Art

A high speed serial bus for transfer of both asynchronous and isochronous data berween a computer and peripheral devices (or nodes) is stadardized by the IEEE in 1995 as "IEEE Standard for a High Performance Serial Bus". Differential signaling is used to detect line state of the serial bus by driving steady state line voltage from the opposite ends of two pairs of twisted wire. At each end of the serial bus, data/strobe signaling is used to drive a firsc line scate voltage on one pair of twisted wire and a second line state voltage on the other pair. The combinacion of the first and second line state voltages represent a particular line state at each end of the serial bus. Using a set of such steady state combinations, arbitration signaling determines which node will gain ownership of the serial bus. However, since the steady state differential signaling is sensitive to cable transmission loss, the maximum length of the inter-nodal cable is currendy limited to 4.5 meters.

Therefore, a need arises to extend the maximum length of the inter-nodal cable. One solution is to convert the digital arbitration signals generated within the arbitration logic circuitry into a codeword and transmit it in serial form, instead of the steady state arbitration signals. However, it is impossible to create a recognizable digital differential line state similar to the steady state differential line state as specified by the IEEE 1394 standard.

SUMMARY OF THE INVENTION

It is therefore an object of the present invention to provide a physical layer interface which uses serial digital signals for two-way transmission over a serial bus and line state detection circuitry for synthesizing a steady state differential line state.

According to one aspect of the present invention, there is provided a physical layer interface for a serial bus comprising a controller for producing parallel data representing a near-end line stare of the serial bus, a line transmitter connected to the controller for converting the parallel data therefrom into serial data and transmitting it to the serial bus, and a line receiver connected to the serial bus for receiving therefrom serial data and converting it into parallel data representing a far-end line state of the serial bus. Differential line state detection circuitry is provided for detecting a differential line state of the serial bus from the parallel data of the controller and the parallel data of the line receiver and applying the detected differential line state to the controller.

According to a second aspect, the present invention provides a physical layer interface for a serial bus which comprises a controller for producing parallel data representing a near-end line state of the serial bus and receiving parallel data representing a differential far-end line state of the serial bus, a line receiver connected to the serial bus for receiving therefrom serial data and producing therefrom parallel data representing the differential far-end line state of the serial bus. Far-end line state detection circuitry is provided for detecting a far-end line state of the serial bus from the parallel data of the controller and the parallel data of the line receiver and producing parallel data representing the detected far-end line state of the serial bus. Differential line state detection circuitry detects a differential line state of the serial bus from the parallel data of the controller and the parallel data of the far-end line state detection circuitry and produces parallel data representing the detected differential line state of the serial bus. A line transmitter converts the parallel data of the differential line state detection circuitry into serial data and transmits the serial data to the serial bus.

Preferably, the line transmitter comprises an encoder for converting the parallel data into a parallel line code, and a parallel-to-serial converter for converting the parallel line code into serial form for transmission, and a the line receiver comprises a serial-to-paralel converter for receiving a serial line code from the serial bus and converting the received line code into a parallel line code, and a decoder for decoding the parallel line code into parallel data for application to the differential line state detection circuitry.

According to a third aspect, the present invention provides a method of arbitration between nodes over a serial bus, comprising the steps of producing parallel data representing a near-end line state of the serial bus, converting the parallel data into serial data and transmitting the serial data to the serial bus, receiving serial data from the serial bus and converting the received serial data to parallel data representing a far-end line state of the serial bus, converting the parallel data representing the near-end line state and the parallel data representing the far-end line state to parallel data representing a differential line state of the serial bus, and making a decision on the parallel data representing the differential line state.

According to a fourth aspect, the present invention provides a method of arbitration between nodes over a serial bus, comprising the steps of producing parallel data representing a near-end line state of the serial bus, receiving serial data from the serial bus and converting the received serial data to parallel data representing a far-end differential line state of the serial bus, making a decision on the parallel data representing the far-end differential line state, converting the parallel data representing the near-end line state and the parallel data representing the far-end differential line state to parallel data representing a far-end line state of the serial bus, converting the parallel data representing the near-end line state and the parallel data representing the fari-end line state to parallel data representing a near-end differential line state of the serial bus, and converting the parallel data representing the near-end differential line state into serial data and transmitting the serial data to the serial bus.

BRIEF DESCRIPTION OF THE DRAWINGS

The present invention will be described in further detail with reference to the accompanying drawings, in which:

FIG. 2 is an illustration of relationships between analog line state voltages of the conventional data-strobe signaling and corresponding digital line states of the present invention;

FIG. 3 is an illustration of input/output reladonships of the differential line state detectors of FIG. 1 along with corresponding analog line state voltages of the data-strobe signaling;

FIG. 5 is an illustration of input/output relationships of the far-end line state detectors of FIG. 4 along with corresponding analog line state voltages of the data-strobe signaling, and FIG. 6 is an illustration of input/output relationships of the diferential line state detectors of FIG. 4 along with corresponding analog line state voltages of the data-strobe signaling.

DETAILED DESCRIPTION

Figure 1:
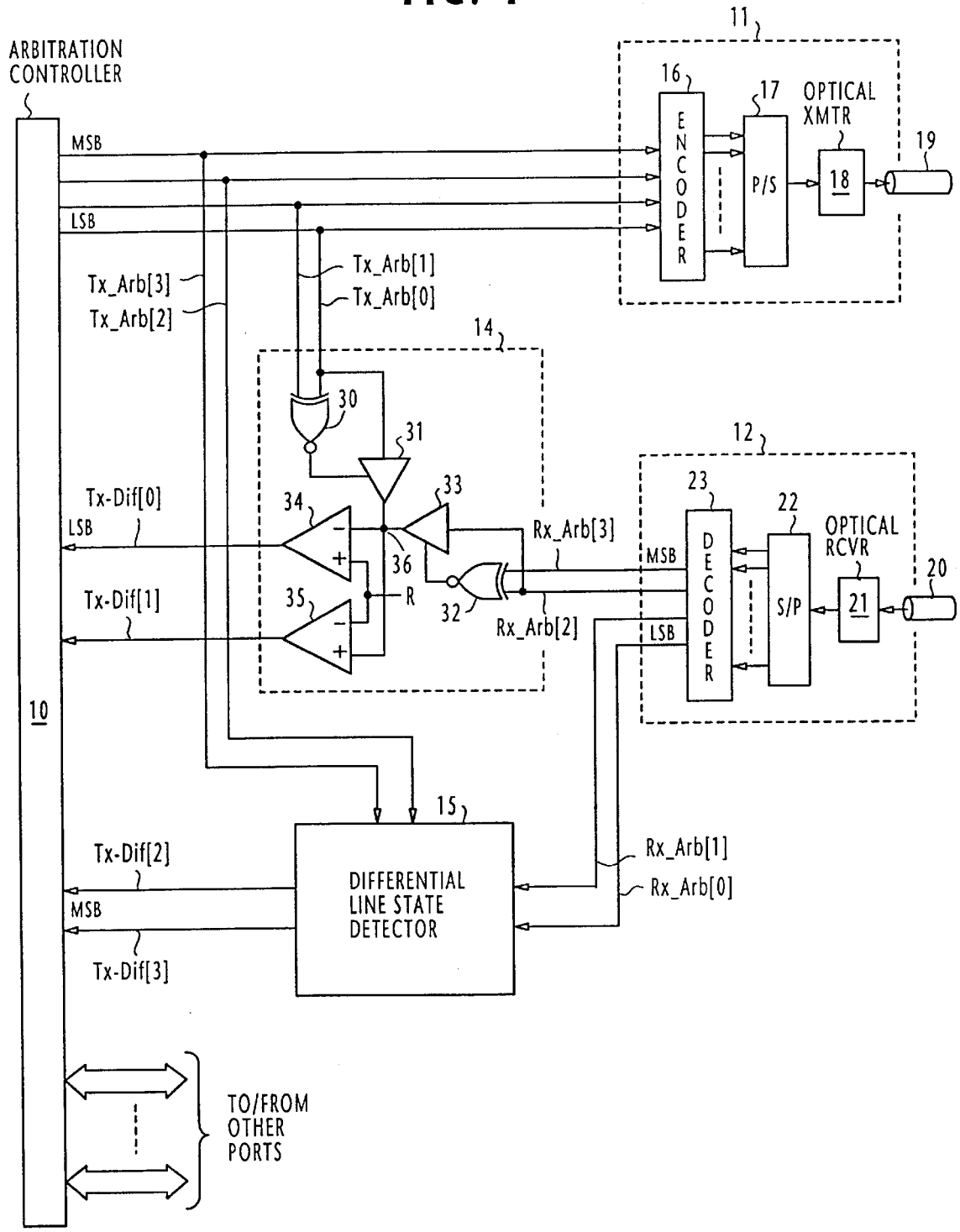
FIG. 1 is a block diagram of a physical layer interce of an IEEE 1394 serial-bus node according to one embodiment of the present invention.

Referring to FIG. 1, there is shown a physical layer interface of an IEEE 1394 serial-bus node according to one embodiment of the present invention. The IEEE-1394 physical layer interface has an arbitration controller 10 and multiple ports for interfacing to respective serial buses. One of the ports is shown including a line transmitter 11, a line receiver 12 and a pair of differential line state detectors 14 and 15 of identical construction. Arbitration controller 10 is connected to the IEEE-1394 link layer of a computer system, not shown. Controller 10 has a state machine logic that drives a near-end line state on a serial bus and causes it to change according to a differential line state of the serial bus detected by the line state detectors 14, 15 from the near-end line state and a far-end line state signaled from an adjacent node, Line transmicter 11 and line receiver 12 are respectively connected to a target node over optical links 19 and 20 of plastic optical fiber for full duplex operation. Each node of the system is identically constructed and the optical links of each node are crosswired along the bus so that signals from the line transmitter 11 of a node are received by the line receiver 12 at the other node. In order to allow the local node to repeat bus traffic between other nodes, a port repeater (not shown) is connected to the arbitration controller 10.

Arbitration controller 10 automatically performs bus configuration during initial power-up of the system or when a node is attached or detached from the bus. Bus configuration begins with Reset and proceeds to the tree identification (Tree ID) and self identification (Self ID) stages. all nodes participate in bus configuration. Once bus configuration has completed, nodes arbitrate for access to the bus and begin normal bus transfers.

Conventional signaling for bus configuration, arbitration and packet transmission is based on differential signaling of line states signaled from the opposite ends of two twisted pairs TPA and TPB. The line state is presented by analog voltages (1, 0, Z) and a set of resultant voltages, or collision states is recognized by adjacent nodes as a particular signaling state. In the present invention, digital line states are signaled from the opposite ends of the optical links. Actually, no differential condition can occur on the optical bus. For this reason, the present invention is to synthesize a differential line state of the bus at each end of the cable by translating digital line state signals signaled on the cable in opposite directions. Differential line state detectors 14 and 15 translate the digital line state signals to synthesize the differential line state.

Instead of using the steady state data-strobe format in which parallel multibit data from the arbitration controller 10 are converted to data and strobe pulses for separate transmission over TPA and TPB, the parallel multibit data from the arbitration controller 10 is converted to a codeword by an "mB/nB" encoder 16 of the line transmitter 11 so that the m-bit parallel data is converted to an n-bit codeword (where n>m) and converted to a serial bit stream in a parallel-to-serial converter 17 and then transformed to an optical signal by an optical transmitter 18 for transmission over the optical link 19.

An optical serial bit stream of mB/nB format from the other node is transmitted via link 20 and received by the line receiver 12 where it is transformed to an electrical signal by an optical receiver 21 and converted to parallel form in a serial-to-parallel converter 22. A decoder 23 performs data conversion on the received n-bit codeword to recover original m-bit parallel data.

The m-bic arbitration signal produced by the controller 10 is ivided into higher- and lower-bit data blocls T_Arb of equal length and the m-bit arbitration signal from the line receiver 12 is likewise divided into higher and lower significant bits Rx_Arb of equal length. For purposes of explanation, the multi-bit data is represented by four bits and each data block by two bits. Each two-bit data block represents one of the analog line tates "Z", "0" and "1". As shown in FIG. 2, data blocks "01", "00" and "11" represent "Z", "0" and "1", respectively. Since conventional twisted pairs TPA and TPB are driven at one of analog voltages 1, 0, Z and a combination of two analog voltages is used to represent a particular line state, correspondence is established between paired combinations of the analog voltages 1, 0, Z signaled on actual twisted pairs TPA and TPB and paired combinations of the data blocks signaled on the optical link 19. The lower signiiicant bits and higher significant bits are signaled on equivalent twisted pairs TPA and TPB, respectively.

Differential line state detector 14 receives the lower-bit data block Tx_Arb [1:0] of a four-bit transmit arbitration signal from the arbitration controller 10 and the higher-bit data block Rx_Arb [3:2] of a four-bit arbitration signal from the line receiver 12 to produce a lower-bit data block Tx_Dif [1:0] of a four-bit pseudo-differential signal. On the other hand, the differential line state detector 15 receives the higher-bit data block Tx_Arb [3:2] of the arbitration signal and the lower-bit data block Rx_Arb [1:0] of the received arbitration signal to produce a higher-bit data block Tx_Dif [3:2] of the pseudo-differential signal.

As illustrated, the differential line state detector 14 includes an exclusive-OR gate 30 to which the lower two bits of the transmit arbitration signal are applied. The output of the excusive-OR gate 30 is inverted to produce a signal fbr enabling a transmit driver 31 which is driven by the least significant bit Tx_Arb [0]. The higher two bits of the arbitration signal received by the line receiver 12 are supplied to an exclusive-OR gate 32 whose output is inverted for enabling a receive driver 33 which is driven by the second most significant bit Rx_Arb [2] of the received arbitration signal.

The output of driver 31 represents the near-end line state of the serial bus and the output of driver 33 represents the far-end line state of the serial bus. The outputs of drivers 31 and 33 are connected together to a common circuit node 36 where a differential voltage of the near-end line state and the far-end line state is developed to synthesize a differential steady state line state as specified by the IEEE 1394 standard. The potential at the circuit node 36 is compared with a reference voltage R by comparators 34 and 35.

It will be seen that when the inputs of one of the exclusive-OR gates 30 and 32 are either "00" or "11", the corresponding driver is enabled and the common circuit node 36 is biased to a low voltage level if the inputs of the gates 30, 32 are "00", causing the comparators 34, 35 to produce lower significant bits "01", or biased to a high voltage level if the inputs of the gates 30, 32 are "11", causing the comparators 34, 35 to produce lower significant bits "10". If the inputs of both exclusive-OR gates 30, 32 are "01", the comparators 34, 35 produce lower significant bits "00".

FIG. 3 illustrates a map for establishing relationships between transmitted line states, received line states and detected pseudo-differential states, and corresponding voltage levels currendy used by the data-strobe signaling.

The operation of the present invention will be better understood with the description of a normal arbitration process between nodes A and B which occurs immediately prior to packet transmission. During the arbitration process, if node A wishes to obtain ownership of the bus, it sends a four-bit request code (00 01) to node B, this code corresponding to a combination of analog line stares Z and 0 respectively signaled on TPA and TPB from node A.

If node B is idle at this moment, it is sending an idle code (00 00) corresponding to the analog idle state (Z, Z) and its state machine will change to a grant state in response co the request code and returns a four-bit grant code (00 01) to node A, this code corresponding to the analog grant state (Z=TPA, 0=TPB).

Upon receipt of the higher significant data block "00" of the request code from the arbitration controller 10 and the lower significant data block "01" of the grant code from the line receiver 12, the differential line state detector 15 produces a higher significant data block "01" of a pseudo-differential code. Differential line state detector 14, on the other hand, responds to the lower significantr data block "01" of the request code from the arbitration controller 10 and the higher significant data block "00" of the grant code from the line receiver 12 by producing a lower significant data block "01" of the pseudo-differential code. Thus, the differential line state code is "0101" which is presented to the arbitration controller 10. In response, the state machine of the arbitration controller changes from request state to transmit state, completing the arbitration process. Once arbitration completes, the winning node initiates packet transmission which begins with "data prefix" signaling and ends with "data end" signaling.

Figure 4:
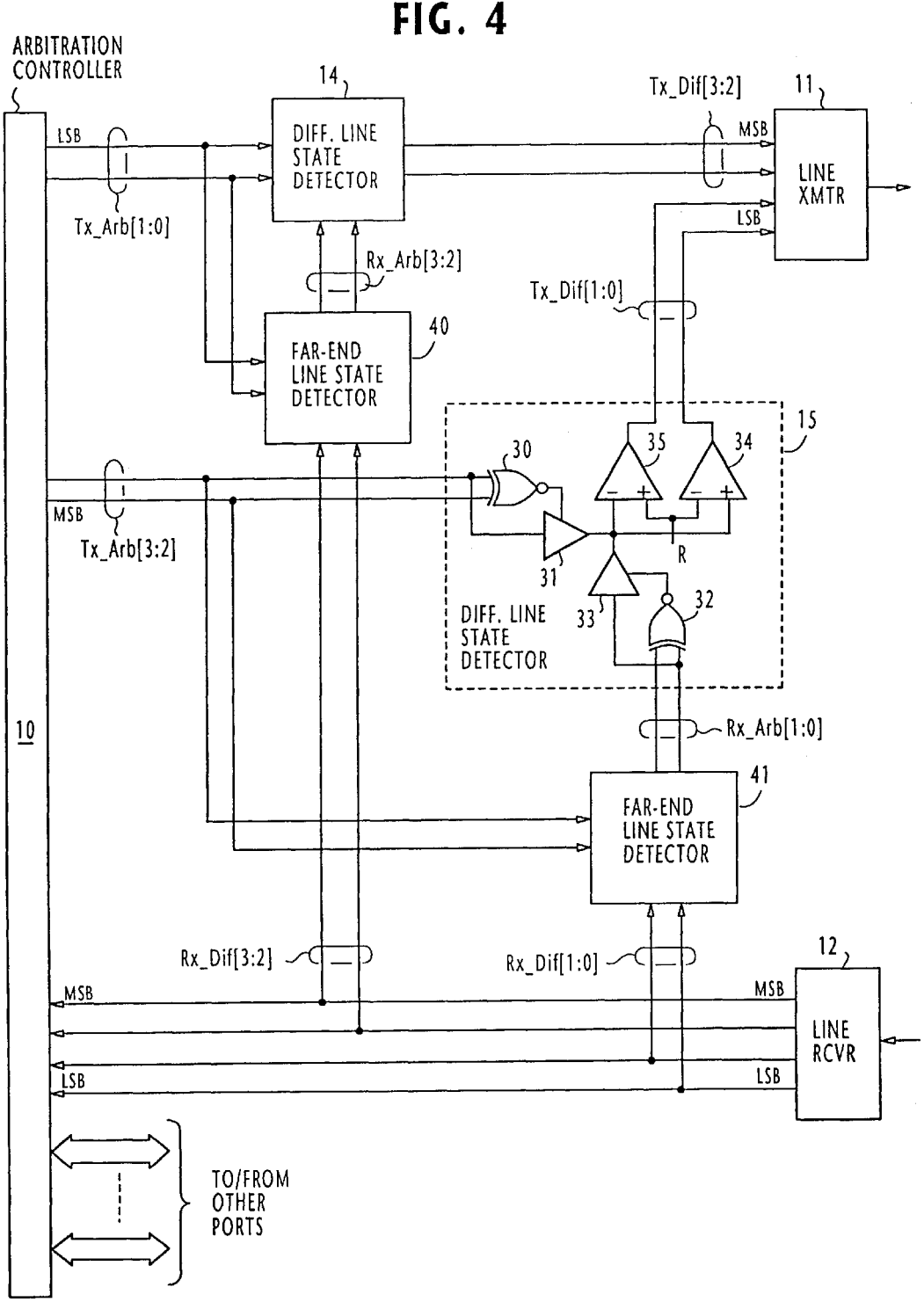
FIG. 4 is a block diagram of a physical layer interface of a modified embodiment of the present invention.

A modified embodiment of this invention is illustrated in FIG. 4 in which parts corresponding in significance to those of FIG. 1 are marked with the same numerals, the description thereof being omitted for simplicity. In this modification, far-end line state detectors 40 and 41 of identical structure are additionally provided to convert a received differential signal (Rx_Dif) according to the map of FIG. 5 to far-end arbitration signals (Rx_Arb) which must have been sent from the other node. The far-end arbitration signals (Rx_Arb) are supplied to the differential line state detectors 14 and 15 which use the map of FIG. 6 to convert the detected far-end arbitration signal (Rx_Arb) from the far-end line state detectors 40, 41 and the near-end arbitration signal (Tx_Arb) from the controller 10 to a near-end differential signal (Tx_Dif) for transmission to the other node, instead of the near-end arbitration signal of the previous embodiment, More specifically, the far-end line state detector 40 receives the higher significant bits Rx_Dif [3:2] of a received differential signal from the line receiver 12 and the lower significant bits Tx_Arb [1:0] of a near-end arbitration signal from the arbitration controller 10 and produces higher significant bits Rx_Arb [3.2] of the far-end arbitration signal which the other node is sending. Far-end line state detector 41 receives the lower significant bits Rx_Dif [1:0] of the received differential signal from the line receiver 12 and the higher significant bits Tx_Arb [3:2] of the near-end arbitration signal from the arbitration controller 10 and produces lower significant bits Rx_Arb [1;0] of the far-end arbitration signal.

Differential line state detector 14 receives the lower significant bits Tx_Arb [1:0] of the near-end arbitration signal from the arbitration controller 10 and the higher significant bits Rx_Arb [3:2] of the far-end arbitration signal from the far-end line state detector 40 and produces higher significant bits Tx_Dif [3:2] of a near-end line state differential signal. On the other hand, the differential line state detector 15 receives the higher significant bits Tx_Arb [3:2] of the near-end arbitration signal from the arbitration controller 10 and the lower significant bits Rx_Arb [1.0] of the far-end arbitration signal from the far-end line state detector 41 and produces lower significant bits Tx_Dif [1:0] of the near-end line state differential signal.

In the differential line state detector 15, the exclusive-OR gate 30 receives the higher two bits of the transmit arbitration signal and the driver 31 is driven by the second most significant bit Tx_AR [2] of the transmit arbitration signal. The lower two significant bits of the output of far-end line state detector 41 are supplied to the exclusive-OR gate 32 and the driver 33 is driven by the least significant bit Rx_Arb [0] of the output of far-end line state detector 41. The outputs of comparators 34 and 35 are supplied to the line transmitter 11 as the lower significant bits of the near-end end differential signal Tx_Dif [1:0], The operation of the modified embodiment will be understood with the description of a normal arbitration process between nodes A and B. During the arbitration process, if node A wishes to obtain ownership of the bus, the arbitration controller 10 applies the higher significant bits "00" of a four-bit request code (00 01) to the far-end line state detector 40 as well as to the differential line state detector 15 and the lower significant bits "01" of the request code to the far-end line state detector 41 as well as to the differential line state detector 14 (this request code corresponds to the analog line state (Z=TPA, 0=TPB). If node B is idle, it is sending an idle code (00 00). Therefore, the far-end line state detectors 40 and 41 are in receipt of the code (00 00) from the line receiver 12. Far-end line state detector 40 thus produce "01" as lower significant bits of a far-end arbitration code as indicated by broken-line rectangle 50 in FIG. 5, while the far-end line state detector 41 produces "01" as higher significant bits of the far-end arbitration code as indicated by broken-line rectangle 51 in FIG. 5. This far-end arbitration code (01 01) is the code which the arbitration controller 10 of node B must be producing.

Differential line state detector 15 of node A thus produces higher significant bits "01" of a neat-end differential code as indicated by broken-line rectangle 52, while the differential line state detector 14 produces lower significant bits "00" of the near-end differential code. Thus, the near-end differential code is (00 01) which is presented to the line transmitter 11 and transmitted to node B which will recognize it as a request code.

In response to the pseudo-differential code (00 01) from node A, the arbitration controller 10 of node B will change from the idle state to a grant state and supplies its far-end line state detectors 40, 41 and differential line state detectors 14, 15 With a grant code (00 01) which corresponds to the analog grant state (Z, 0) as described in the previous embodiment. With the grant code (00 01) and the differential code (00 01) being supplied from the arbitration controller 10 and the line receiver 12, the far-end line state detectors 40 and 41 of node B produce a far-end line state (00 01), recognizing that node A is sending a request code. Using the grant code (00 01) and the estimated receive code (00 01), the differential line state detectors 14 and 15 of node B produce a near-end differential code (01 01) which is transmitted to node A. Node A recognizes this signal as a grant code and changes from request state to transmit state, completing the arbitration process.

What is claimed is:

1. A physical layer interface for a serial bus comprising:
    a controller for producing parallel data representing a near-end line state of the serial bus;
    a line transmitter connected to the controller for converting the parallel data therefrom into serial data and transmitting the serial data to said serial bus;
    a line receiver connected to the serial bus for receiving therefrom serial data and converting the received serial data into parallel data representing a far-end line state of the serial bus; and
    differential line state detection circuitry for detecting a differential line state of said serial bus from the parallel data of the controller and the parallel data of the line receiver and applying the detected differential line state to said controller.

2. The physical layer interface of claim 1, wherein said serial bus comprises an optical transmission medium.

3. The physical layer interface of claim 1, wherein said line transmitter comprises:
    an encoder for converting the parallel data of the controller into a parallel codeword; and
    a parallel-to-serial converter for converting the parallel codeword into serial form for transmission, and
    wherein said line receiver comprises:
        a serial-to-parallel converter for receiving a serial codeword from the serial bus and converting the received codeword into a parallel codeword; and
        a decoder for decoding the parallel codeword into parallel data for application to said differential line state detection circuitry.

4. The physical layer interface of claim 1, wherein said differential line state detection circuitry includes a map for mapping the parallel data representing the near-end line state and the parallel data representing the far-end line state to the parallel data representing the differential line state of said serial bus.

5. The physical layer interface of claim 1, wherein said differential line state detection circuitry comprises:
    a first circuit responsive to parallel data from the controller for producing a first line state voltage at a common circuit node;
    a second circuit responsive to parallel data from the line receiver for producing a second line state voltage at said common circuit node; and
    a comparator circuit for comparing a differential line state voltage developed at said common circuit node with a reference potential and producing a signal representative of the differential line state of said serial bus.

6. The physical layer interface of claim 1, wherein said differential line state detection circuitry comprises:
    a first differential line state detector including:
        a first circuit responsive to lower significant bits of the parallel data of the controller for producing a first line state voltage at a first common circuit node;
        a second circuit responsive to higher significant bits of the parallel data from the line receiver for producing a second line state voltage at the first common circuit node; and
        a first comparator circuit for comparing a differential line state voltage developed at said first common circuit node with a reference potential and producing lower significant bits of parallel data representative of the differential line state of the serial bus; and
    a second differential line state detector including:
        a third circuit responsive to higher significant bits of the parallel data from the controller for producing a third line state voltage at a second common circuir node;
        a fourth circuit responsive to lower significant bits of the parallel data from the line receiver for producing a fourth line state voltage at the second common circuit node; and
        a second comparator circuit for comparing a differential line state voltage developed at the second common circuit node with a reference potential and producing higher significant bits of the parallel data representative of the differential line state of the serial bus.

7. A physical layer interface for a serial bus comprising:
    a controller for producing parallel data representing a near-end line state of the serial bus and receiving parallel data representing a far-end differential line state of the serial bus;
    a line receiver connected to the serial bus for receiving therefrom serial data and converting the received serial data to parallel data representing said far end differential line state of the serial bus;
    far-end line state detection circuitry for detecting a far-end line state of the serial bus from the parallel data of the controller and the parallel data of the line receiver and producing parallel data representing the detected far-end line state of the serial bus;
    differential line state detection circuitry for detecting a near-end differential line state of said serial bus from the parallel data of the controller and the parallel data of the far-end line state detection circuitry and producing parallel data representing the detected near-end differential line state of the serial bus; and
    a line transmitter for converting the parallel data of the differential line state detection circuitry into serial data and transmitting the serial data to said serial bus.

8. The physical layer interface of claim 7, wherein said serial bus comprises an optical transmission medium.

9. The physical layer interface of claim 7 wherein said line transmitter comprises:
    an encoder for converting the parallel data of the differential line state detection circuitry into a parallel codeword; and
    a parallel-to-serial converter for converting the parallel codeword into serial form for transmission, and
    wherein said line receiver comprises:
        a serial-to-parallel converter for receiving a serial codeword from the serial bus and converting the received codeword into a parallel codeword; and
        a decoder for decoding the parallel codeword into parallel data for application to said controller and said far-end line state detection circuitry.

10. The physical layer interface of claim 7, wherein said differential line state detection circuitry includes a map for mapping the parallel data representing the near-end line state and the parallel data representing the far-end line state to the parallel data representing the differential line state of said serial bus.

11. The physical layer interface of claim 7, wherein said differential line state detection circuitry comprises:

a first circuit responsive to parallel data from the controller for producing a first line state voltage at a common circuit node;

a second circuit responsive to parallel data from the far-end line state detector for producing a fourth line state voltage at said common circuit node; and a comparator circuit for comparing a differential line state voltage developed at said common circuit node with a reference potential and producing parallel data representative of the differential line state of said serial bus.

12. A method of arbitration between nodes over a serial bus, comprising the steps of:

a) producing parallel data representing a near-end line state of the serial bus;

b) converting said parallel data into serial data and transmitting the serial data to said serial bus;

c) receiving serial data from said serial bus and converting the received serial data to parallel data representing a far-end line state of the serial bus;

d) converting the parallel data representing the near-end line state and the parallel data representing the far-end line state to parallel data representing a differential line state of the serial bus; and e) making a decision on the parallel data representing the differential line state.

13. A method of arbitration between nodes over a serial bus, comprising the steps of:

a) producing parallel data representing a near-end line state of the serial bus;

b) receiving serial data from the serial bus and converting the received serial data to parallel data representing a far-end differential line state of the serial bus;

c) making a decision on the parallel data representing the far-end differential line state, d) converting the parallel data representing the near-end line state and the parallel data representing the far-end differential line state to parallel data representing a far-end line state of the serial bus;

e) converting the parallel data representing the near-end line state and the parallel data representing the far-end line state to parallel data representing a near-end differential line state of the serial bus; and f) converting the parallel data representing the near-end differential line state into serial data and transmitting the serial data to said serial bus.

14. A transmit/receive circuit connected to a transmission medium, comprising:

a state machine for shifting a transition state according to a differential state of said transmission medium produced by signals simultaneously transmitted thereto and producing an outgoing signal according to said transition state;

a transmit circuit for forwarding the outgoing signal from the state machine onto said transmission medium;

a receive circuit for receiving an incoming signal from said transmission medium; and a collision synthesizing circuit for synthesizing a collision state of said outgoing and incoming signals and applying the synthesized collision state to said state machine as said differential state.

15. The transmit/receive circuit of claim 14, wherein said collision synthesizing circuit is arranged to:

convert said parallel outgoing signal and said parallel incoming signal to analog signals, synthesize said collision signal from the analog signals, convert the synthesized collision signal to a digital signal; and apply the digital signal to said state machine as said differential state.

16. The transmit/receive circuit of claim 15, wherein said analog signals are three-state signals.

17. A transmit/receive circuit connected to a transmission medium, comprising:

a state machine for shifting a transition state according to a differential state of said transmission medium produced by signals simultaneously transmitted thereto and producing a parallel outgoing signal according to said transition state; a transmit circuit for converting the parallel outgoing signal from the state machine to a serial line-coded signal and forwarding the serial line-coded signal onto said transmission medium;

a receive circuit for decoding a serial incoming line-coded signal from said transmission medium to a parallel incoming signal; and a collision synthesizing circuit for synthesizing a collision signal from said parallel outgoing signal and said parallel incoming signal and applying the synthesized collision signal to said state machine as said differential state.

18. The transmit/receive circuit of claim 17, wherein said collision synthesizing circuit is arranged to:

convert said parallel outgoing signal and said parallel incoming signal to analog signals, synthesize said collision signal from the analog signals, convert the synthesized collision signal to a digital signal; and apply the digital signal to said state machine as said differential state.

19. The transmit/receive circuit of claim 17, wherein said analog signals are three-state signals.

20. A transmit/receive circuit connected to a transmission medium, comprising:

a state machine for shifting a transition state according to a differential state of said transmission medium produced by signals simultaneously transmitted thereto and producing an outgoing signal according to said transition state;

a transmit circuit for forwarding an outgoing collision signal onto said transmission medium;

a receive circuit for receiving an incoming collision signal from said transmission medium and applying the received collision signal to said state machine as said differential state;

an outgoing signal synthesizing circuit for synthesizing, from the incoming collision signal received by the receive circuit and the outgoing signal of said state machine, and outgoing signal of an adjacent transmit/receive circuit connected to said transmission medium; and a collision synthesizing circuit for synthesizing a collision signal from the outgoing signal of said state machine and said synthesized outgoing signal and applying the synthesized collision signal to said transmit circuit as said outgoing collision signal.

21. The transmit/receive circuit of claim 20, wherein said collision synthesizing circuit is arranged to:

convert the outgoing signal of said state machine and said synthesized outgoing signal to analog signals, synthesize said collision signal from the analog signals, convert the synthesized collision signal to a digital signal, and apply the digital signal to said transmit circuit as said outgoing collision signal.

22. The transmit/receive circuit of claim 21, wherein said analog signals are three-state signals.

23. A transmit/receive circuit connected to a transmission medium, comprising:

a state machine for shifting a transition state according to a differential state of said transmission medium produced by signals simultaneously transmitted thereto and producing a parallel outgoing signal according to said transition state;

a transmit circuit for converting the parallel outgoing signal to a serial line-coded signal and forwarding the serial line-coded signal onto said transmission medium;

a receive circuit for receiving an incoming collision signal from said transmission medium and applying the received collision signal to said state machine as said differential state;

an outgoing signal synthesizing circuit for synthesizing, from the incoming collision signal received by the receive circuit and the outgoing signal of said state machine, an outgoing of an adjacent transmit/receive circuit connected to said transmission medium; and a collision synthesizing circuit for synthesizing a collision signal from the outgoing signal of said state machine and said synthesized outgoing signal and applying the synthesized collision signal to said transmit circuit as said outgoing collision signal.

24. The transmit/receive circuit of claim 23, wherein said collision synthesizing circuit is arranged to:

convert the outgoing signal of said state machine and said synthesized outgoing signal to analog signals, synthesize said collision signal from the analog signals, convert the synthesized collision signal to a digital signal, and apply the digital signal to said transmit circuit as said outgoing collision signal.

25. The transmit/receive circuit of claim 24, wherein said analog signals are three-state signals.

* * * * *

UNITED STATES PATENT AND TRADEMARK OFFICE
CERTIFICATE OF CORRECTION

PATENT NO. : 6,324,611 B1
DATED : November 27, 2001
INVENTOR(S) : Takayuki Nyu

It is certified that error appears in the above-identified patent and that said Letters Patent is hereby corrected as shown below:

<u>Title page,</u>
ABSTRACT,
Line 7, delete "dtaa" insert -- data --

<u>Column 1,</u>
Line 21, delete "firsc" insert -- first --;
Line 23, delete "combinacion" insert -- combination --;
Line 30, delete "currendy" insert -- currently --;
Line 49, delete "stare" insert -- state --

<u>Column 2,</u>
Line 16, delete "a";
Line 17, delete "paralel" insert -- parallel --;
Line 56, delete "intercc" insert -- interface --

<u>Column 3,</u>
Line 15, delete "ivention" insert -- invention --;
Line 28, delete "transmictor" insert -- transmitter --;
Line 41, delete "all" insert -- All --

<u>Column 4,</u>
Line 12, delete "m-bic" insert -- m-bit --;
Line 13, delete "ivided" insert -- divided --;
Line 13, delete "T____Arb" insert -- Tx____Arb --;
Line 28, delete "signiicant" insert -- significant --

<u>Column 5,</u>
Line 17, delete "stares" insert -- states --;
Line 21, delete "co" insert -- to --

UNITED STATES PATENT AND TRADEMARK OFFICE
CERTIFICATE OF CORRECTION

PATENT NO. : 6,324,611 B1
DATED : November 27, 2001
INVENTOR(S) : Takayuki Nyu

It is certified that error appears in the above-identified patent and that said Letters Patent is hereby corrected as shown below:

<u>Column 6,</u>
Line 23, delete "Tx____AR" insert -- Tx____Arb --

Signed and Sealed this

Twenty-sixth Day of March, 2002

Attest:

JAMES E. ROGAN
*Attesting Officer*     *Director of the United States Patent and Trademark Office*